(12) United States Patent
Park et al.

(10) Patent No.: US 6,638,630 B2
(45) Date of Patent: *Oct. 28, 2003

(54) COMPOSITION AND METHOD FOR A COATING PROVIDING ANTI-REFLECTIVE AND ANTI-STATIC PROPERTIES

(75) Inventors: Sung-Soon Park, Los Angeles, CA (US); Haixing Zheng, Oak Park, CA (US)

(73) Assignee: Chemat Technology, Inc., Northridge, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/991,765

(22) Filed: Nov. 21, 2001

(65) Prior Publication Data

US 2002/0119325 A1 Aug. 29, 2002

Related U.S. Application Data

(63) Continuation of application No. 09/394,987, filed on Sep. 13, 1999, now Pat. No. 6,372,354.

(51) Int. Cl.[7] .................................................. B32B 9/04
(52) U.S. Cl. ............ 428/447; 106/287.16; 106/287.17; 106/287.19; 252/519.3; 252/520.1; 252/520.2; 252/521.6; 359/581; 359/585; 359/586; 427/419.1; 427/419.2; 427/419.3; 427/425; 427/427; 428/697; 428/699; 428/701; 428/702; 428/704
(58) Field of Search .................. 106/287.16, 287.17, 106/287.19; 252/519.3, 520.1, 520.2, 521.6; 359/581, 585, 586; 427/419.1, 419.2, 419.3, 425, 427; 428/447, 697, 699, 701, 702, 704

(56) References Cited

U.S. PATENT DOCUMENTS

| | | |
|---|---|---|
| 3,996,068 A | 12/1976 | Urry |
| 4,273,826 A | 6/1981 | McCollister et al. |
| 4,286,024 A | 8/1981 | Yoldas |
| 4,476,156 A | 10/1984 | Brinker et al. |
| 4,535,026 A | 8/1985 | Yoldas et al. |
| 4,652,467 A | 3/1987 | Brinker et al. |
| 4,710,227 A | 12/1987 | Harley et al. |
| 4,731,264 A | 3/1988 | Lin et al. |
| 4,966,812 A | * 10/1990 | Ashley et al. ............... 428/412 |
| 5,198,267 A | 3/1993 | Aharoni et al. |
| 5,385,955 A | 1/1995 | Tarshiani et al. |
| 5,476,717 A | 12/1995 | Floch |
| 5,580,819 A | 12/1996 | Li et al. |
| 5,622,784 A | 4/1997 | Okaue et al. |
| 5,719,705 A | 2/1998 | Machol |
| 5,770,306 A | 6/1998 | Suzuki et al. |
| 6,245,428 B1 | 6/2001 | Port et al. |

FOREIGN PATENT DOCUMENTS

| | | |
|---|---|---|
| EP | 0 166 363 B1 * | 8/1991 |
| EP | 0924537 A1 | 6/1999 |
| EP | 1022587 A1 | 7/2000 |
| WO | WO 00/27931 | 5/2000 |

OTHER PUBLICATIONS

Ashley & Reed, "Sol–Gel AR Films for Solar Applications," presentation at Better Ceramics Through Chemistry II, Materials Research Society Symposium, Apr. 15–18, published Materials Research Society Proceedings, vol. 73, pp. 671–677 (Sep. 1986).

Pettit & Brinker, Use of Sol–Gel Thin Films in Solar Energy Applications, Solar Energy Materials, vol. 14, pp. 268–287 (1986).

* cited by examiner

*Primary Examiner*—D. S. Nakarani
(74) *Attorney, Agent, or Firm*—Blakely Sokoloff Taylor & Zafman LLP

(57) ABSTRACT

Coating solutions having anti-reflective and anti-static properties, a coating derived therefrom, a substrate coated with the coating and methods for their preparation. A coating includes a sol-gel alkoxide polymeric material and a conductive colloidal metal compound material.

20 Claims, 2 Drawing Sheets

COMPOSITION AND METHOD FOR A COATING PROVIDING ANTI-REFLECTIVE AND ANTI-STATIC PROPERTIES

CROSS-REFERENCE TO RELATED APPLICATION

The application is a Continuation of application Ser. No. 09/394,987, filed Sep. 13, 1999 by applicants, Sung-Soon Park and Haixing Zheng, entitled "Composition and Method for a Coating Providing Anti-Reflective and Anti-Static Properties", now U.S. Pat. No. 6,372,354.

This invention was made with government support under grant number 1R43EY12461-01 awarded by the National Institute of Health.

BACKGROUND OF THE INVENTION

1. Field of the Invention

The invention relates to surface coating solutions and films, and particularly to coatings having anti-reflective and anti-static properties.

2. Related Art

In optical applications, substrates such as glass and plastic have been widely used. Plastics, as compared with glass, are less expensive, more easily formed into complex shapes, lighter in weight and generally not as brittle. Accordingly, the use of plastics, such as polycarbonates and acrylic polymers, is increasing in optical applications. Both glasses and plastics, however, suffer from reflective losses at the substrate/air interface, the losses averaging about seven percent of the transmitted light for the two surfaces. The reflective loss is even more severe in substrates having high index of refractions (e.g., index of refractions on the order of 1.55 or more). While numerous practical approaches to reducing the reflective losses for glass substrates have been developed, few low temperature techniques are available for plastic substrates at low cost.

Anti-reflective (AR) coatings or films offer one way to reduce the reflective losses at the substrate/air interface. AR coatings reduce the reflectance of light from a surface thereby increasing the light transmittance through the coating/substrate interface. One challenge to using AR coatings on organic substrates like plastic is forming such films at temperatures that will not melt or deform the substrate.

Low temperature AR coatings are primarily made by vacuum deposition techniques. In general, there are two types of vacuum deposition techniques: vacuum evaporation and vacuum sputtering. In vacuum evaporation, a charge of the material to be evaporated is placed in a crucible of a refractory material. An electrical resistance heater heats this charge (either by conduction or by radiation) after the chamber has been evacuated to about $10^{-6}$ torr. As the temperature of the charge rises, its vapor pressure rises and a significant evaporation develops. The evaporant then condenses on the cooler substrate. Vacuum sputtering, on the other hand, is characterized by a momentum transfer process in which argon or other ions and atoms from a plasma bombard a target made of the material to be coated. The collision of the argon atoms and ions with the surface atoms and molecules of the target knocks off (sputters) the target material, which then forms a deposit on the substrate. Both of the vacuum deposition techniques (evaporation and sputtering) produce high quality AR coatings or films. Generally, the disadvantages of vacuum deposition are: (1) large capital expenditure for deposition equipment, (2) possible temperature build up that can deform or melt a plastic substrate, (3) restricted substrate size and geometry due to equipment limitations, and (4) separate coating processes may be required for each surface.

U.S. Pat. No. 5,719,705 discloses a transparent multi-layer AR coating wherein each layer comprises an electrically conductive, high-refractive index or an electrically-conductive, low-refractive index material using vacuum deposition techniques: electron beam reactive evaporation, ion-assisted deposition, and reactive sputtering of metal targets. The resultant AR coating, in addition to not attracting dust and other airborne contaminants, and has hydrophobic properties.

In addition to vacuum deposition techniques, AR surfaces can also be formed by chemical modification of a surface by a reactive plasma at low temperature. Again, this generally requires expensive equipment, possible heat build up, and size limitations.

Solutions containing fluorinated organics have also been deposited on plastic substrates which then exhibited AR properties, such as an apparatus described in U.S. Pat. No. 5,198,267. Fluorination processes appear, however, to be limited to self-developing photographic film applications and do not appear to be adaptable for large scale applications.

U.S. Pat. No. 4,966,812 describes the development of a process for applying a single layer, AR coating to a plastic substrate via micro-structural tailoring of a sol-gel solution. In the process, a silicon alkoxide, metal alkoxide or a mixture thereof is subjected to hydrolyzation then condensation in a solution to form a sol-gel hydrolyzation, followed by further condensation to form a polymeric reaction product. The gel formed from the sol- is reliquified. The reliquified gel is then diluted to increase its stability and to form the sol-gel AR surface coating solution. From this solution, a film with a low index of refraction (e.g., on the order of 1.22) can be deposited on a plastic substrate without heating or etching. This reliquified gel contains large polymers in solution resulting in a deposited film with greater porosity, and hence a lower refractive index. By careful control of the coating rate, the optimum film thickness can be obtained.

U.S. Pat. No. 5,476,717 describes a process to make a single layer AR coating for a plastic substrate. This single AR coating layer is formed from colloids of silica in a siloxane binder. Several other layers have been integrated into the process in order to enhance the adhesion, abrasion resistance, and hydrophobic properties. In general, the structure comprises an organic or inorganic substrate, successively covered by an adhesion-promoting coating made from a material chosen from among silanes, an anti-reflection coating of silicon colloidals coated with a siloxane binder, a coupling agent coating formed from a material chosen from among the silaxanes, and an anti-abrasive coating of a fluorine polymer.

U.S. Pat. No. 5,580,819 describes a composition for producing durable coatings and a process for preparing a single-layer AR coating on solid substrates, such as glass, ceramics, metals, and organic polymeric materials. The coating composition comprises, in combination, acid-catalyzed hydrolysis and condensation products of a water-silane monomer mixture and a film forming amount of a polymer having functional groups selected from amino, hydroxy and carboxy, hydroxy and amino, amino and carboxy, and amino, hydroxy and carboxy. The described process comprises applying the aforesaid coating composition (or an acid catalyzed sol-gel coating composition), substantially free of pre-formed oxide sol and water soluble metal salt, to the surface of a solid substrate, curing the applied coating, and treating the cured coating with an aqueous electrolytic solution for a time sufficient to produce a coating having graded porosity which is anti-reflective over a broad band of the visible spectrum.

U.S. Pat. No. 4,361,598 describes the use of sol-gel techniques to deposit two layer AR $SiO_2/TiO_2$ coatings onto solar cells and stainless steel or silicon ribbon. The refractive index range attainable using mixtures of these solutions is 1.4–2.4. The refractive index required for AR film on plastics is generally about 1.22 and cannot be achieved using the method described without the introduction of porosity. In addition, the method described requires heat treatments considerably higher than the typical upper temperature limits of plastics. Refractive index control is achieved by compositional control, firing temperature (300° C.–600° C.) and the firing atmosphere.

U.S. Pat. No. 5,858,526 primarily describes a method to make a two-layer AR coating having a high reflective index by a sol-gel solution process. Metal oxide colloids are coated with a polyvinyl material and rendered soluble in water-containing molecular solvents. The coating consists of a half wave-thick zirconia-polyvinyl pyrolidone layer of 1.72 refractive index and a quarter wave-thick porous silica-siloxane layer of 1.26 index. Both layers are centered at 600-nm wavelength. In general, this two layer AR coating is not abrasion resistant, and the AR coating also has poor adhesion. To achieve a moderate abrasion-resistance and hydrophobic behavior, the coating is overcoated with a very thin layer of a lubricating material. This lubricating material slightly permeates the porous silica layer underneath and hence increases the refractive index value a bit from 1.26 up to 1.30. In addition, several adhesion promoting layers containing organosilanes generally must be deposited between the layers to promote adhesion.

SUMMARY OF THE INVENTION

Coating compositions having anti-reflective and anti-static properties, a coating derived therefrom, a substrate coated with the coating and methods for their preparation are described. In one aspect, a coating in accordance with the invention comprises a multilayer or composite layer of a sol-gel alkoxide polymeric layer and a conductive colloidal metal compound layer over a hardcoat or scratch-resistant layer on a substrate.

Objects, advantages, and novel features of this invention will be apparent to those skilled in the art upon examination of the following detailed description and accompanying drawings learned in the practice of the invention.

BRIEF DESCRIPTION OF THE DRAWINGS

The accompanying figures, which are incorporated in and form part of the specification, illustrate an embodiment of the invention and, together with the description, serve to explain the principles of the invention. However, these figures, as well as the following detailed description and examples, are given by way of illustration only and thus are not intended to limit the invention.

DETAILED DESCRIPTION OF THE INVENTION

Figure 1:
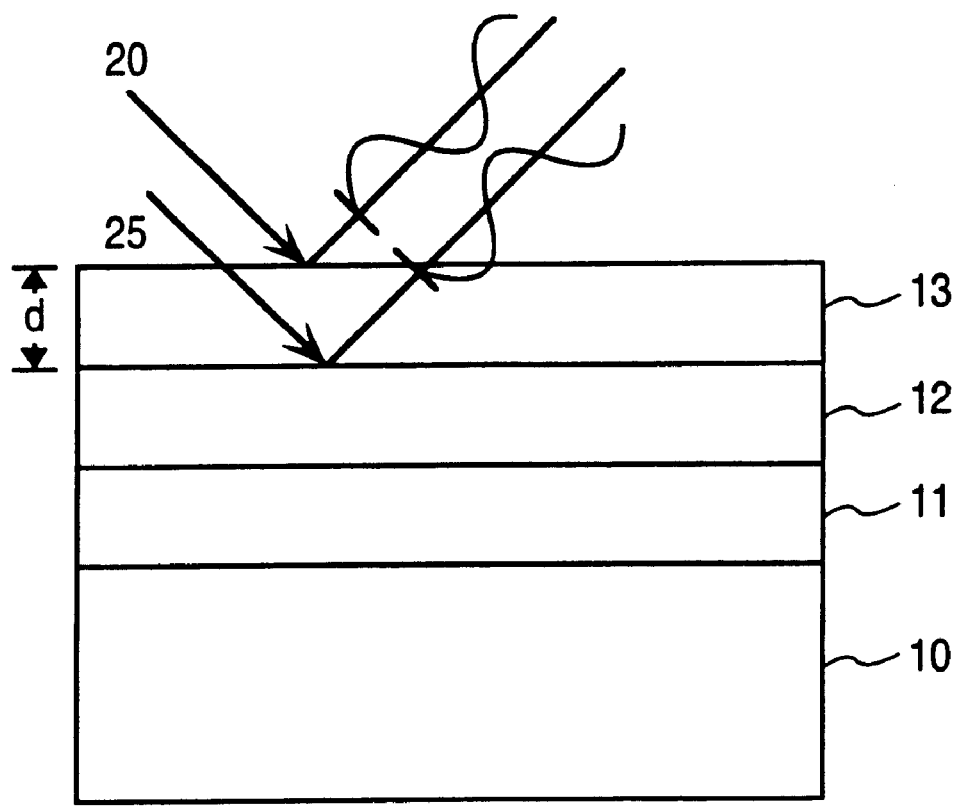
FIG. 1 shows a composite coating on a substrate in accordance with an embodiment of the invention.

According to the invention, there is provided a method for the preparation and the low temperature application of a composite coating or film having anti-reflective (AR) and anti-static properties on a substrate, a method for making conductive crystalline colloidal solution and using the resulting solution, and a method for tailoring the growth of polymers in solution in order to deposit a low reflective index sol-gel film as part of the multi-layer coating.

In general, sol-gel is a process that uses alkoxides, $M(OR)_x$, as oxide glass precursors, where M is at least one of silicon (Si), titanium (Ti), boron (B), aluminum (Al), zirconium (Zr) or other ceramic types of metals; R is an alkyl group, having, for example, 1–8 carbon atoms; and x is equal to the valence state of the cation. The contemplated alkoxides, when mixed with water and a catalyst in an alcohol solution, undergo hydrolysis and condensation reactions to form a polymeric network. The polymer, which continues to crosslink until a gel is formed, expels its solvent, and upon heating, densifies to form a glass. Glass coatings can be applied using sol-gel technology. Processing temperatures to form a glass by sol-gel techniques are typically much lower than conventional glass formation via melting of metal oxides.

An embodiment of a low reflective index $SiO_2$ layer is made by sol-gel derived $SiO_2$ sols. The silicon alkoxides undergo hydrolyzation and condensation. More particularly, the $SiO_2$ sols are formed from a reaction system that comprises a silicon alkoxide mixed with water and a catalyst in an alcohol solution. In one example, the alkoxides are represented by formula $Si(OR)_4$; where R is an alkyl group having 1–8 carbon atoms, and more preferably having 1–4 carbon atoms. One polymeric reaction product is formed from monomeric alkoxides of tetraethylorthosilicate (TEOS), in an alcohol solution also containing water and an acid catalyst. An $SiO_2$ coating solution suitable for use in an embodiment of an AR coating on a substrate is prepared by diluting the sol with alcohol solvents. A typical dilution is a solution such that the weight percent of the sol is 0.5 to 5.0 percent. A thin glass film or layer having a thickness in the sub-micron range can be deposited by spinning, spraying or dipping. The film has a reflective index in the range of 1.20–1.45.

One embodiment of a coating according to the invention involves combining the polymerized alkoxide layer with a high reflective index layer on a substrate. The high index layer is made from a high reflective index conductive crystalline colloidal solution. In one aspect, the high index crystalline colloidal solution is made by dispersion of conductive crystalline powders into organic liquids.

In one embodiment, the conductive powders of the colloidal solution include, but are not limited to, particles of Indium Tin Oxide (ITO), Indium Oxide (IO), Tin Oxide (TO), Antimony Tin Oxide (ATO), and Titanium Oxide ($TiO_x$). Other suitable powders includes, but are not limited to, metal nitrides (e.g., titanium nitride), metal carbides (e.g., titanium carbide), and metal fluorides (e.g., titanium fluoride). The powders are made by either vacuum processes or wet processes as known in the art. The powders are typically made by a grinding process to a particle size suitable for forming a transparent film or layer. The particle size, in one embodiment, is less than one micron and on the order of one hundred to several hundred nanometers. Particle sizes on the order of 120 to 145 nanometers have been shown to be suitable in films without producing streaking or opaqueness.

The colloidal solutions are typically prepared by grinding and dispersing the conductive powders into organic solvents mixed with dispersing agents. The dispersing agent is suitably soluble in alcohols. A suitable dispersing agent is chosen from an amide, including but not limited to, dimethylformamide (DMF). In one embodiment, the respective proportions of the oxide particles and dispersing agent are, by weight, between approximately 20 and 50 percent based on the solvent.

The colloidal solutions are prepared by mechanical mixing of the conductive powders in the dispersing agent containing solvent solution. The mechanical mixing methods include, but are not limited to, grinding and shaking. During grinding of these powders, unpaired electrons of carbonyl (—C=O) of amide are believed to chemically bond with surface metal of the grounded powder. An acid, such as nitric acid, is then added into the surface modified particles solution. It is believed that the proton ($H^+$) of the acid bonds with the nitrogen of the amide which is bonded to the oxide particles. This proton bond results in particles with positive surface charge. The particles repel each other and form stable colloids.

For use as a colloid coating solution, the colloids are diluted by mixing with alcohol solvents to approximately 1.0 to 15.0 percent by weight of the solution.

One embodiment of a method for preparing a surface coating composition according to the invention comprises several features. The coating composition of the invention may be introduced on an organic (e.g., plastic), glass or other substrate. The coating composition may be introduced directly onto a base surface of the substrate or over an adhesion or hardcoat composition. A typical hardcoat composition for an organic substrate is polysiloxane. The introduction of a hardcoat onto a substrate surface is known in the art.

The diluted high index colloidal solution is introduced as a first layer over a hardcoat overlying a surface of a substrate or onto a bare surface of a substrate. In one example, the colloidal solution is introduced by a spinning process. Spinning continues for about one minute to form a stable high index first layer having a thickness on the order of 500–1500 Å. The diluted sol-gel low index coating solution is then overcoated on the high index first layer by spinning. Spinning continues for about one minute to form a stable low index second layer having a thickness on the order of 500–1000 Å. The substrate, which is now coated with a first layer of high index metal compound and a second layer of low index $SiO_2$, is baked at a temperature of 50 to 100° C. for about one hour.

As noted above, in one embodiment, the composite coating is introduced over a hardcoat layer on, for example, a plastic substrate. The introduction of the first layer (e.g., high index ITO material) and the second layer (e.g., low index $SiO_2$ material) by a process such as spinning tends to embed the first layer material and possibly the second layer material in the hardcoat layer. This embedding renders durability to the composite coating of the invention.

The colloidal coating solution that forms the first layer contains volatile alcohol solvents that evaporate during spinning. Although the capillary force of the solvents between particles tends to form compact structure layers, the evaporation of the solvents leaves behind open or closed pores in the spin-coated first layer. It is believed that open pores of the first layer will be filled with the second layer material (e.g., $SiO_2$) during spinning. During baking of a coated organic substrate, the solvents in the two layers evaporate. Gels (e.g., $SiO_2$ gels) in the second layer contact each other to form a continuous -M-O-M-O- network by polycondensation. Also M-OR groups of the gel, which have permeated in the lower metal compound layer, react, representatively, with the —OH, —NH, —CH, or —F groups of the metal compound particles. This results in good chemical bonding of the gels to the metal oxide particles. In the example where the first layer is a metal oxide layer material of ITO and the second layer material is $SiO_2$, a typical reaction may be illustrated as follows:

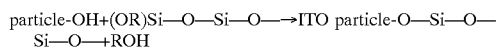
particle-OH+(OR)Si—O—Si—O—→ITO particle-O—Si—O—Si—O—+ROH

The continuous —Si—O—Si—O— network of the $SiO_2$ gels in the low index $SiO_2$ layer and in the high index ITO layer contacts the ITO layer vertically and horizontally. This results in a compact microstructure of a composite of the high index ITO material and the low index $SiO_2$ material although the composite is dried at the low temperature of 50 to 100° C. In one respect, the low temperature formation of the composite coating on a substrate is achieved by the following: (1) the densification of low index $SiO_2$ layer through polycondensation of $SiO_2$ sols, and (2) the permeation of $SiO_2$ sols into the high index ITO layer and the chemical bonding between $SiO_2$ gels and ITO particles.

FIG. 1 illustrates an embodiment of a composite coating of the invention over an organic substrate, such as a plastic substrate. FIG. 1 shows hardcoat layer 11 overlying a surface of substrate 10 having a thickness of approximately 1–10 µm. Overlying hardcoat layer 11 is first layer 12 of, for example, a high index metal oxide colloid. Overlying first layer 12 is second layer 13 of, for example, a low index alkoxide polymer. It is to be appreciated that the individual layers do not necessarily overly one another with a distinct interface between each layer. Instead, as noted above particularly with spin operations, second layer material fills pores in first layer 12 and first layer material, and possibly second layer material, is embedded in hardcoat layer 11.

By controlling the thickness of the individual layers of the composite coating of the invention, a desired AR property of the coating may be achieved. In one embodiment, second layer 13 acts as an interference layer that modifies the path difference of light incident on substrate 10. In general, the thickness of second layer 13 may be determined for destructive interference by the relationship:

$$d = \frac{\lambda}{4n_0}$$

where d represents the thickness of second layer 13, λ represents the wavelength where zero reflectivity is desired (i.e., complete destructive interference), and $n_0$ represents refractive index of second layer 13. As illustrated in FIG. 1, ideally the anti-reflectance of the multi-layer is achieved when light waves 20 and 25 are completely out of phase.

The composite coating of the invention is formed from coating solutions comprising a high index conductive compound colloid solution and a sol-gel low index oxide sol solution. The coating is useful for coating organic substrates in that the deposited film acquires a desired refractive index and thickness without having to heat treat the deposited coating at a high temperature, or heat treat the film followed by an etching step.

An article of the invention comprises, in one embodiment, an organic substrate having the aforementioned composite coating deposited thereon. Suitable organic substrates include plastics including optical lenses. In one embodiment, the method of the invention for coating a substrate with the coating comprises introducing to the surface of a substrate (such as an organic substrate) a colloidal anti-reflective surface coating solution comprising a high index colloid and sol-gel low index oxide sols thereof to introduce a coating onto the substrate. The coating is preferably cured at a temperature from about 50° C. to 100° C.

A method of the invention is an inexpensive, generally simpler process compared to prior techniques as it eliminates the need for expensive evaporators or plasma equipment. The formulating and aging of a sol-gel does not require complex or expensive equipment. Simple film application techniques, including spinning, dipping, or spraying permit the coating of large complicated shapes, and even simultaneous coating of the inner and outer surfaces of a tube. The large scale application of a colloidal surface coating is possible without a limit on the size of the part to be coated. As noted above, there are many prior art sol-gel AR surface coatings applied to vitreous substrates. However, the process of the invention eliminates the necessity to heat and/or etch the sol-gel coating to produce a porous, low index, anti-reflecting glassy film.

In addition to its AR property, the composite coating of the invention also possesses an anti-static property. In the embodiment described above, the composite coating is conductive, having a sheet resistance on the order of $1.7 \times 10^6$ to $2.3 \times 10^6$ ohms per square. The anti-static property arises from the conductive nature of the coating. The anti-static property of the composite coating of the invention allows a coated substrate to resist the collection of dust particles.

The composite coating of the invention is particularly useful for coating various substrates such as glass, ceramics, metals, and organic polymeric materials to increase light transmission, anti-static and EMI shielding performance, without need to subject the coating or the substrate to high temperature curing processes. Substrates coated with the coating of the invention may be used, for example, in ophthalmic lenses, display filters and solar photovoltaic applications.

Figure 2:
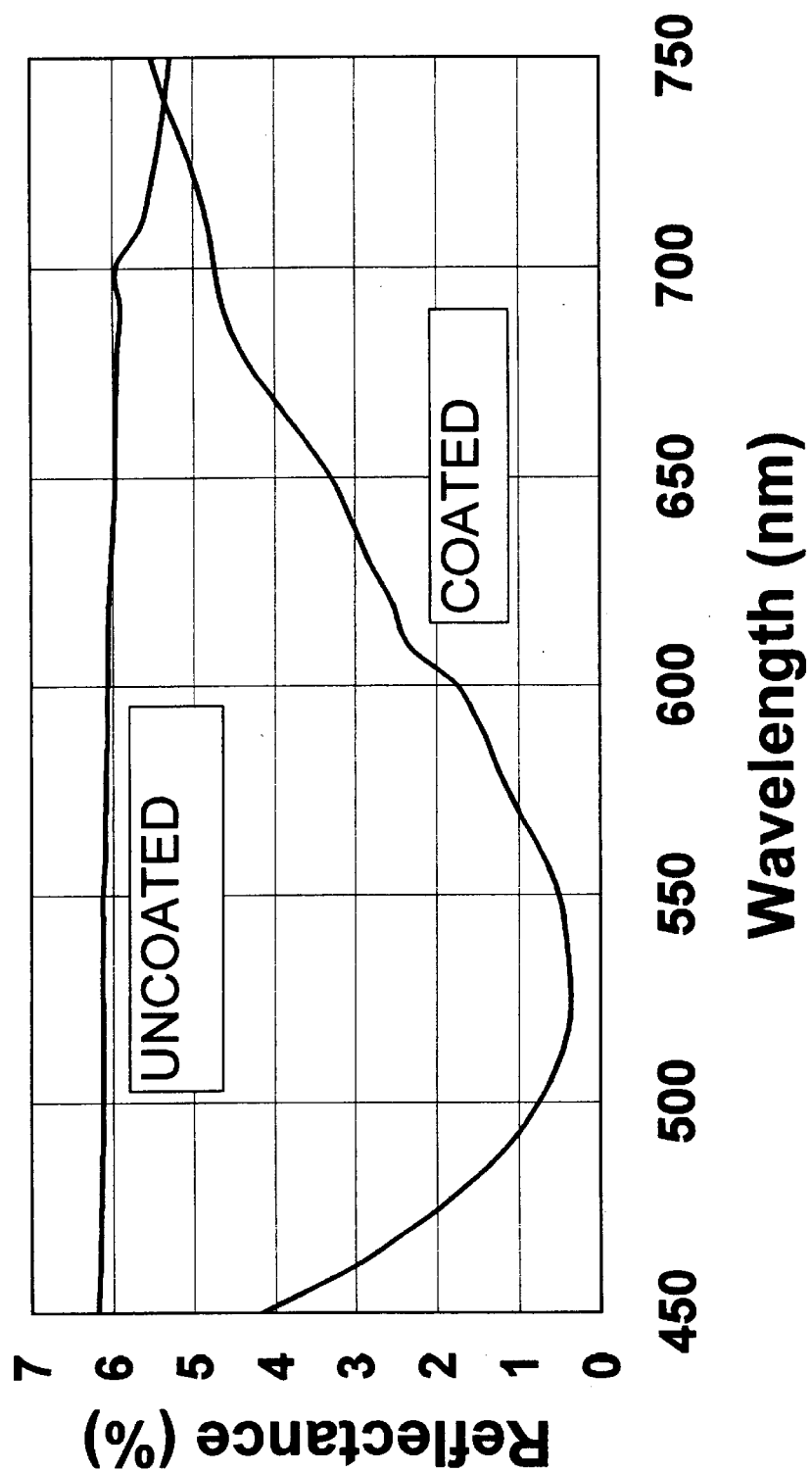
FIG. 2 shows reflectance of an embodiment of the composite coating of the invention versus wavelength measured from 450–750 nanometers.

The invention deposits a composition having a well controlled thickness and refractive index, thereby exhibiting minimum reflectance at a predetermined wavelength. FIG. 2 shows the reflectance of an embodiment of a composite coating according to the invention (ITO/SiO$_2$) over a wavelength range of 450 to 750 nanometers. Optical measurements of reflectance or transmittance are made using a Shimazu UV-1601 spectrophotometer equipped with 5-degree specular reflectance accessory. The composite coating is cured at relatively low temperatures to form a durable coating having anti-static characterics. In one case, the coating is formed on a plastic substrate, such as a plastic lens.

Having been generally described, the following examples are given as particular embodiments of the invention, to illustrate some of the properties and demonstrate the practical advantages thereof, and to allow one skilled in the art to utilize the invention. It is understood that these examples are to be construed as merely illustrative.

EXAMPLE 1

The preparation of a high refractive index metal oxide, ITO (Indium Tin Oxide) colloidal coating solution is made as follows: 15 grams of ITO powder, 60 grams of dimethylformamide (DMF), 75 grams of ethanol, and 200 grams of zirconia bead are placed in a 250 cm$^3$ glass bottle. The ITO powder is ground for approximately 1 to 24 hours using a ball mill. The pH of the ITO colloid is controlled in the range of 2 to 8. The ITO colloid is diluted to 1.0 to 15.0 weight percent with a mixed solvent of methanol, ethanol, butanol, 2-methoxyethanol, and 1-methoxy 2-propanol.

EXAMPLE 2

The preparation of a low refractive index metal oxide, silica colloidal coating solution is made as follows: 200 grams of tetraethylorthosilicate (TEOS), 100 grams of ethanol, and 200 grams of water are mixed together for 30 minutes. The pH of the mixed solution is controlled to 1.0 to 4.0. The pH controlled solution is aged at 50° C. for 2 to 24 hours. The silica colloid is diluted to 0.5 to 6.0 weight percent with a mixed solvent of methanol, ethanol, isopropanol, butanol, 2-methoxyethanol, diacetone alcohol, and 1-methoxy2-propanol.

EXAMPLE 3

The example illustrates the introduction of a composite coating according to the invention on a plastic substrate having a hardcoat of polysiloxane on a surface thereof. Hardcoat is applied on plastic, acrylic polymer substrate to a thickness of 1–10 μm. The 2.3 weight percent ITO colloidal coating solution of Example 1 is spin-coated on the hardcoat of the plastic substrate at the rate of 300 rpm for one minute to a thickness of 500–1500 Å. Silica coating solutions of different concentrations are spin-coated on different substrates over the ITO layer at the rate of 300 rpm for one minute to a thickness of about 500–1000 Å. The substrates with the hardcoat/ITO/silica are baked at 100° C. for 30 minutes to form a hard coating. Table 1 shows the reflectance of the baked substrates at a wavelength of 550 nm.

TABLE 1

| Concentration of ITO coating solution | Concentration of silica coating solution | Absolute reflectance at the wavelength of 550 nm |
|---|---|---|
| 2.3 wt. % | 1.4 wt. % | 0.35 |
| 2.3 wt. % | 1.5 wt. % | 0.38 |
| 2.3 wt. % | 1.6 wt. % | 0.57 |

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. An apparatus comprising:
    a substrate;
    a first crystalline metal compound layer overlying the substrate comprising crystalline particles having a particle size less than one micron, the first layer having a first reflective index; and
    a second layer overlying the substrate and having a second reflective index different than the first reflective index.

2. The apparatus of claim 1, wherein the second layer is derived from an alkoxide of the general formula:

M(OR)$_x$ wherein M is selected from at least one of the group consisting of Si, Ti, B, Al, and Zr, and
    wherein R is an alkyl group having 1–8 carbons and x is the valence state of the cation.

3. The apparatus of claim 1, wherein the substrate comprises plastic.

4. The apparatus of claim 1, wherein the first layer overlies a surface of the substrate and the second layer overlies the first layer.

5. The apparatus of claim 4, wherein the thickness of the second layer is selected to destructively interfere with light reflected by the first layer.

6. The apparatus of claim 4, further comprising a hard coat layer overlying the surface of the substrate between the substrate and the first layer.

7. The apparatus of claim 1, wherein the first reflective index is greater than the second reflective index.

8. The apparatus of claim 1, wherein the metal compound of the first layer is selected from the group consisting of a metal oxide, a metal nitride, a metal carbide, and a metal fluoride.

9. A method comprising:

forming a first layer of a crystalline metal compound having a first reflective index on a surface of a substrate; and forming a second layer having a second reflective index different than the first reflective index on the substrate.

10. The method of claim 9, wherein the second layer is derived from an alkoxide of the general formula:

$$M(OR)_x$$

wherein M is selected from at least one of the group consisting of Si, Ti, B, Al, and Zr, and wherein R is an alkyl group having 1–8 carbons and x is the valence state of the cation.

11. The method of claim 10, wherein the second layer is applied over the first layer and after the application of the first layer and the second layer, the method further comprises exposing the substrate to a temperature of 50 to 100° C.

12. The method of claim 10, wherein the second layer is applied over the first layer.

13. The method of claim 12, wherein the metal compound of the first layer is selected from the group consisting of indium tin oxide, indium oxide, tin oxide, antimony tin oxide, and titanium oxide.

14. The method of claim 12, further comprising controlling the pH of the colloid solution in the range of 2 to 8.

15. The method of claim 12, wherein the dispersing agent comprises an amide.

16. The method of claim 10, wherein forming the second layer further comprises:

subjecting the alkoxide to hydrolyzation and condensation in a reaction system containing a catalyst in an alcohol solution;

aging the system to form a sol-gel reaction product;

diluting the reaction product; and forming the reaction product on the surface of the substrate.

17. The method of claim 9, wherein forming the first layer further comprises:

dispersing metal compound powders having a particle size of less than one micron with a dispersing agent into a colloid solution; and forming the colloid solution layer on the surface of the substrate.

18. The method of claim 9, wherein the first layer and the second layer are introduced by a spinning process.

19. A method for preparing a coating solution comprising:

dispersing crystalline metal compound powders having a particle size less than one micron with a dispersing agent into a colloid; and diluting the colloid.

20. The method of claim 19, wherein the metal compound is selected from the group consisting of a metal oxide, a metal nitride, a metal carbide, and a metal fluoride.

* * * * *